Dec. 13, 1949  F. JACOBS  2,490,814
CHEST FASTENER UNIT
Filed June 5, 1945

INVENTOR.
FRANK JACOBS
BY
William D. Hall.
ATTORNEY

Patented Dec. 13, 1949

2,490,814

UNITED STATES PATENT OFFICE 2,490,814

CHEST FASTENER UNIT

Frank Jacobs, Asbury Park, N. J.

Application June 5, 1945, Serial No. 597,684

5 Claims. (Cl. 312—111)

(Granted under the act of March 3, 1883, as amended April 30, 1928; 370 O. G. 757)

1

The invention described herein may be manufactured and used by or for the Government for governmental purposes, without the payment to me of any royalty thereon.

This invention relates to portable containers, and more particularly, to fasteners for physically coupling chests rigidly together, for transportation or stationary use.

Devices have been used for securing chests or boxes, especially those containing instruments, so they will be kept in alignment in a substantial manner during transportation, or, if set up, together. The chests are usually assembled one over the other. In a particular earlier form, this type of device consisted of two flat plates with a narrow intervening rectangular strap-piece running from one plate to the other. The device coupled two adjacent chests placed one above the other, the plate on one chest being adjacent to the plate on the other. This strap-piece was bolted in place on the chests by a single bolt for each plate. This piece bridged over the contacting edges and held the chests together; but being relatively narrow did not prevent sidewise movements thereof. This was bad for the chests, and eventually damaged the pieces and rendered them useless. The next step, to reduce this movement, was to provide similar straps on both sides at each corner juncture; that is eight to a rectangular box. These required additional work and time to put on and use. If the devices were not installed correctly, or in proper alignment, they also allowed the chests to shift and slide on each other, in an undesirable manner. In addition, some of the devices were so placed on the sides that they were frequently hard to get at, especially when the chests were stored in quantities, side-by-side, without appreciable space between. To store them far apart on ships, or in freight cars, would render their cost of transportation extremely high, when such chests were transported in large quantities, and, therefore, they were impractical.

It is an object of the present invention to provide a new and improved fastener unit for coupling chests together that will avoid one or more of the disadvantages and limitations of fasteners previously developed in the prior art.

A further object of the present invention is to provide a new and improved fastener unit for coupling chests together that will be of such substantial construction as not to require more than two units for a complete assembly, and, yet, provide a proper holding arrangement, that will prevent undue movement of the chests held by it, in any direction.

An additional object of this invention is to provide a new and improved fastener unit for coupling chests together that can be readily assembled or disassembled.

A still further object of this invention is to provide a new and improved fastener unit for coupling chests together that can be rotated and positioned out of the way when not in use.

In accordance wtih a particular form of the invention, a chest-fastener unit comprises an upper plate having bosses projecting therefrom, adapted to receive fasteners therein, the plate being attached to a chest. A lower plate also is provided and attached to an adjacent chest, and also has similar bosses thereon. A centerboard having openings therein may be positioned to align said openings with the bosses in the upper and lower plates. The fasteners are passed through these bosses and openings, and hold the centerboards to the plates, whereby relative movements of the chests are prevented.

Referring now to the drawing.

Similar numerals refer to similar parts throughout the drawing.

Figure 1:
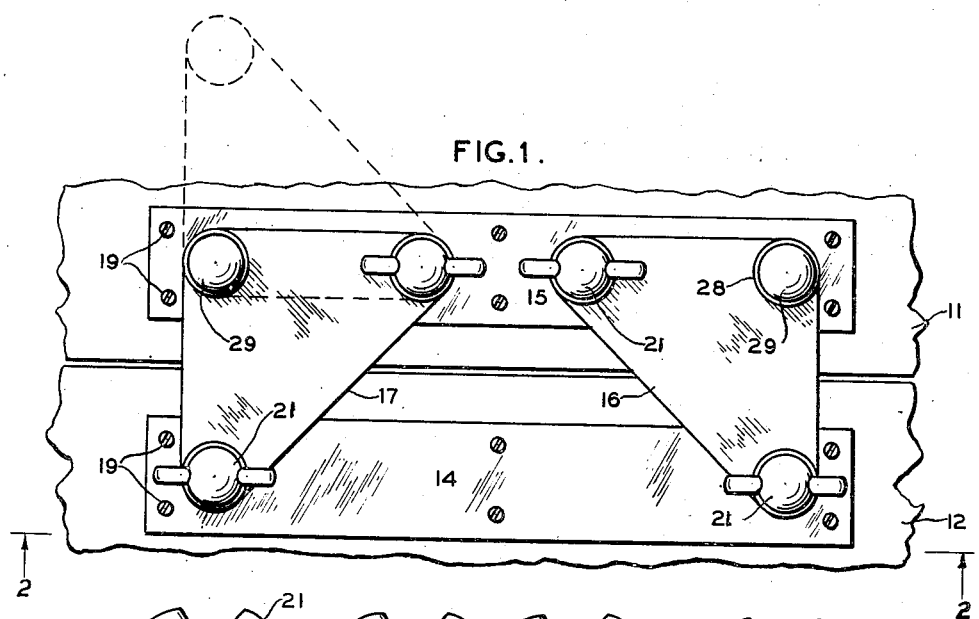
Figure 1 is a composite elevational view of a chest-fastening unit.
Figure 2:
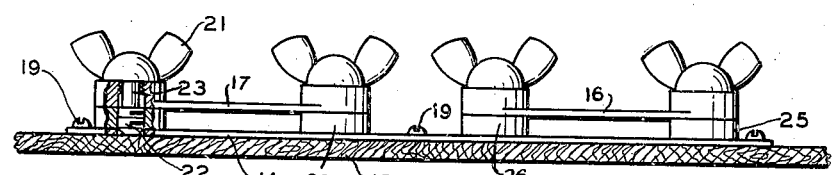
Figure 2 is a cross section, taken on line 2—2 of Fig. 1, partly broken away and sectioned to show the interior of one of the bosses and openings.
Figure 3:
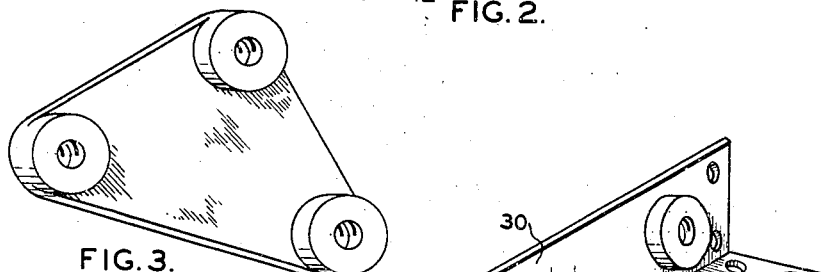
Figure 3 is a perspective view of a triangular centerboard.

Referring to the particular form in the drawings, 11 and 12 represent two chests of conventional, rectangular form intended to be used together, for which reason they are mechanically coupled together, so as to make a quasi-integral unit. In order to so couple the chests together, one above the other, a fastener unit of a particular form is indicated in Fig. 1. The unit comprises a lower plate 14, an upper plate 15, a right centerboard 16, and a left centerboard 17. The lower plate 14 may be of rectangular form with a plurality of holes close to its edges, for the insertion of screws 19 to secure the plate rigidly to the side of the chest 12, adjacent to the middle of an upper edge. Bosses 25 extend out perpendicularly from the front surface of the plate 14, near its ends. These bosses are drilled and tapped to take winged fastener bolts 21 which are threaded on their end portions 22. The shank portions 23 of these bolts are unthreaded and cut back, as indicated. The upper plate 15 is likewise provided with a plurality of screw holes so that it may be screwed to the side of a chest 11 adjacent to the middle of a lower edge thereof. There are four internally screw-threaded bosses in a horizontal row on this upper plate, the two inner bosses being indicated by the reference numeral 26. The distance between each inner boss 26 and its nearest outer boss (also on plate 15) is equal to the distance between said outer boss (on said plate 15) and the boss 25 (on plate 14). Each of the centerboards 16, 17 has the configuration of a right isosceles triangle and is provided with at boss at each corner. These bosses on the centerboards 16, 17 are drilled large for the greater part of their length, but restricted and screw-threaded near the top, so as to require the winged bolts 21 to be threaded in at the beginning of insertion, and then go through freely. This screw-threaded portion prevents the bolts 21 from falling out, when the latter are unscrewed from the bosses in the chest plates 14, 15. It keeps the bolts ready to use when the plates and centerboards are disassembled.

In the use of the device, the upper and lower plates 15, 14 are permanently fastened to the upper and lower chests 11, 12 to be coupled together. The bosses on the plates 14, 15 project outwardly from said plates, as indicated. The spacing of the plates mounted on the chests enables the centerboards 16, 17 to swing about the corner bolts 29, so that the three bosses on each centerboard are in register with three bosses on the plates 14, 15 (as shown in Fig. 1). Normally, when not in use, each centerboard 16, 17 is bolted up, out of the way, as shown by the dotted outline in Fig. 1. These bolts 29 are preferably provided with rivet heads to prevent unauthorized tampering therewith. Although a nut head of the hexagon or square type may be used, it is found to encourage improper tampering. The wing bolts 21 are used in a conventional manner to secure the centerboard rigidly to the plates. When so secured, the whole unit becomes a double solid fastener between the chests. Two of such units, one at the back, another at the front, afford ample fastening between two chests. The triangular form of each centerboard 16, 17 permits it to be moved in and out of attachment readily, and enables the double chest arrangement to be installed with the greatest effectiveness and facility.

Figure 4:
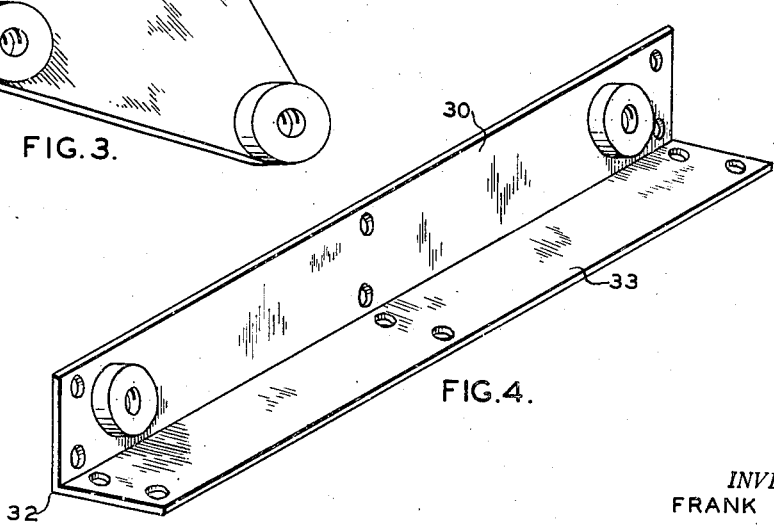
Figure 4 is a perspective view of a modified form of lower plate member for securing a chest to a floor.

In Fig. 4 is shown a modified form of right angle lower plate member 32, which comprises a vertically disposed lower plate element 30 and a horizontally disposed floor plate 33. This permits the unit to be used for securing a chest to a floor.

While there has been described what is at present considered to be a preferred embodiment of this invention, it will be apparent to those skilled in the art that various changes and modifications may be made therein without departing from the invention or the principles thereof. It is therefore intended in the appended claims to cover all such changes and modifications as fall within the true spirit and scope of the invention.

What is claimed is:

1. A chest fastener unit comprising in combination, an upper plate including a plurality of openings adapted to receive fasteners therein, said plate being arranged for rigid attachment to the exterior of a chest, a lower plate arranged for rigid attachment to a second chest including a plurality of openings adapted to receive fasteners therein, a plurality of triangularly formed centerboards each having at least three openings therein arranged to align with at least three of the openings of said upper and lower plates, and fasteners passing through said openings for holding the centerboards to said plates, whereby the plates are rigidly connected through the centerboards and are retained against relative vertical and horizontal movement, said fasteners being adjacent the corners of the centerboards, with a pair of fasteners connecting each of the centerboards to one of said plates and one fastener of each pair acting as a permanent pivot to facilitate the swinging of the centerboards into and out of position.

2. A chest fastener unit comprising in combination, an upper plate including a plurality of bosses projecting from one side thereof and adapted to receive fasteners therein, said plate being arranged for rigid attachment to the exterior of a chest, a lower plate having a plurality of bosses thereon adapted to receive fasteners therein, a plurality of triangular centerboards having plural bosses thereon arranged to align with the bosses of said upper and lower plates, and fasteners passing through said bosses for holding the centerboards to said plates, whereby the plates will be rigidly connected through the centerboards and retained against relative vertical and horizontal movement, said fasteners being adjacent the corners of the centerboards, with a pair of fasteners connecting each of the centerboards to one of said plates and one fastener of each pair acting as a permanent pivot to facilitate the swinging of the centerboards into and out of position.

3. A chest fastener unit comprising in combination, an upper plate including a plurality of bosses adjacent to corners thereof projecting from one side thereof and adapted to receive screw-fasteners therein, said plate being arranged for rigid attachment to the exterior of a chest, a lower plate having a plurality of bosses adjacent to corners thereof adapted to receive screw-fasteners therein, a plurality of triangular centerboards having plural perforated bosses thereon arranged to align with the bosses in said upper and lower plates, and screw-fasteners passing through said bosses for holding the centerboards to said plates, whereby the plates will be rigidly connected through the centerboards assembled substantially parallel to the plates and are held against relative vertical and horizontal movement, said fasteners being adjacent the corners of the centerboards, with a pair of fasteners connecting each of the centerboards to one of said plates and one fastener of each pair acting as a permanent pivot to facilitate the swinging of the centerboards into and out of position.

4. A chest fastener unit comprising in combination, an upper plate including a plurality of projecting parts from one surface thereof, said plate being arranged for rigid attachment to the exterior surface of a chest, a lower plate for attachment to a second chest having a plurality of projecting parts thereon similar to those on said upper plate adapted to receive fasteners therein, a pair of triangular centerboards having plural projecting parts similar to those aforesaid thereon arranged to align with the said parts of the said upper and lower plates, and fasteners passing through said parts for holding the centerboards to said plates, whereby the plates are rigidly connected and held against relative vertical and horizontal movement and the chests are coupled together, said fasteners being adjacent the corners of the centerboards, with a pair of fasteners connecting each of the centerboards to one of said plates and one fastener of each pair acting as a permanent pivot to facilitate the swinging of the centerboards into and out of position.

5. A chest fastener unit comprising in combination, an upper plate including a plurality of projecting parts from one side thereof, said plate being arranged for rigid attachment to the exterior surface of a first chest, a lower plate for attachment to a second chest having a plurality of projecting parts thereon similar to those on the first mentioned plate adapted to receive fasteners therein, a pair of triangular centerboards having plural projecting parts similar to those aforesaid arranged to align with the said parts, said centerboards being swingable to take different positions relative to the chests and said upper and lower plates, and fasteners passing through said parts for holding the centerboards to said plates, whereby the plates and chests are rigidly connected and held against relative vertical and horizontal movement, said fasteners being adjacent the corners of the centerboards, with a pair of fasteners connecting each of the centerboards to one of said plates and one fastener of each pair acting as a permanent pivot to facilitate the swinging of the centerboards into and out of position.

FRANK JACOBS.

REFERENCES CITED

The following references are of record in the file of this patent:

UNITED STATES PATENTS

| Number | Name | Date |
|---|---|---|
| 221,109 | Seiler | Oct. 28, 1879 |
| 868,501 | Stanley | Oct. 15, 1907 |
| 1,111,209 | Boyle et al. | Sept. 22, 1914 |
| 2,043,893 | Hedges | June 9, 1936 |